Patented Jan. 8, 1946

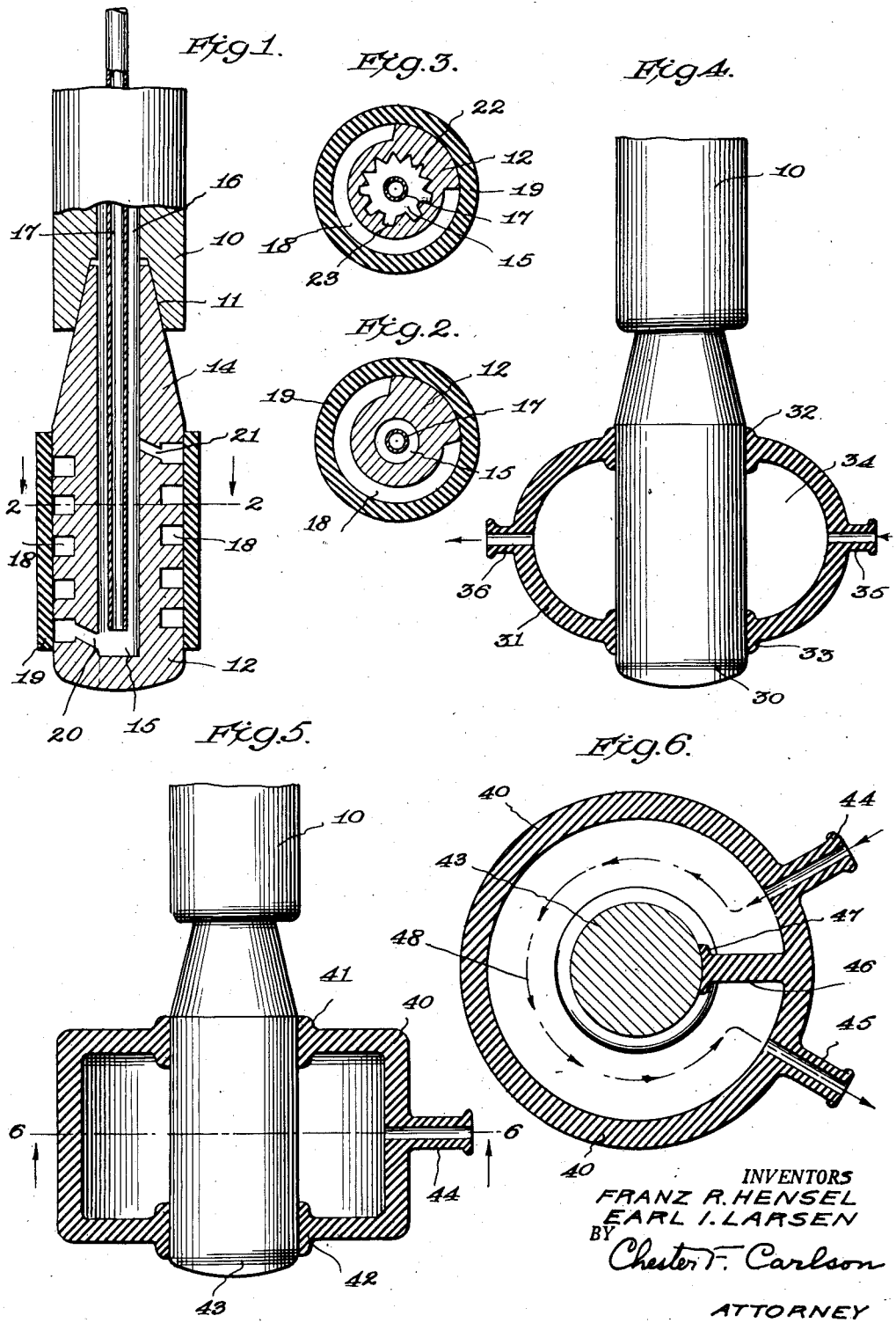

2,392,736

UNITED STATES PATENT OFFICE 2,392,736

WELDING ELECTRODE COOLING

Franz R. Hensel and Earl I. Larsen, Indianapolis, Ind., assignors to P. R. Mallory & Co., Inc., Indianapolis, Ind., a corporation of Delaware Application May 2, 1944, Serial No. 533,690

7 Claims. (Cl. 219—4)

The present invention relates to the art of welding electrode cooling, and, more particularly, to novel and improved means for internally and externally cooling a welding electrode.

In certain resistance welding operations, particularly when spot welding metals of high electrical conductivity such as aluminum and aluminum alloys, considerable difficulty was experienced in maintaining the welding electrodes at low temperatures. It was customary to provide internal channels or recesses in the welding electrode and its holder and to pass a cooling fluid therethrough such as water or some other suitable liquid refrigerant. It was also suggested to surround the welding electrode with a rigid metallic cooling jacket fluid-tightly attached to the outer surface of the electrode and to force a cooling fluid through such jacket. None of these conventional expedients, however, was completely satisfactory and successful. During continued resistance welding operations the tip of the welding electrode would soon reach undesirably high temperatures and would spread out or "mushroom" requiring frequent reconditioning or complete replacement of the electrode.

It is an object of the present invention to eliminate this difficulty and inconvenience experienced in the operation of conventional welding electrode and cooling structures.

It is another object of the present invention to provide a welding electrode and holder organization in which the cooling fluid is passed in heat exchange relation with both the internal and the external surface of the welding electrode whereby a greatly increased cooling efficiency is obtained and the welding electrode retains its original shape for an extended period without appreciable spreading out or "mushrooming" and furthermore retains a high electrical conductivity thereby decreasing the danger of the electrode sticking to the work.

It is a further object of the invention to provide an external cooling structure for welding electrodes which may be readily attached and which is adaptable to a great variety of welding electrode types.

It is also within the contemplation of the invention to provide external cooling jackets of novel and improved character for welding electrodes, said jackets being constituted of elastic material having means forming a fluid-tight joint with the external surface of the electrode and being adapted to define a cooling space therewith.

The invention also contemplates a welding electrode cooling system which is very simple in character, positive and foolproof in its operation and which may be easily incorporated into existing welding installations without requiring any troublesome or expensive structural changes.

Other and further objects and advantages of the invention will become apparent from the following description taken in conjunction with the accompanying drawing; in which:

Fig. 1 illustrates a vertical sectional view, somewhat fragmentary in character, of a welding electrode and holder organization embodying the principles of the invention;

Fig. 2 depicts a section taken on line 2—2 of Fig. 1;

Fig. 3 shows a view similar to Fig. 2 of a modified embodiment of the invention;

Fig. 4 is a vertical sectional view, having parts in elevation, of an external cooling jacket for a welding electrode;

Fig. 5 is a similar sectional view of a modified form of an external cooling jacket; and Fig. 6 is a horizontal sectional view taken on line 6—6 of Fig. 5.

While a few preferred embodiments of the invention are described herein, it is contemplated that considerable variation may be made in the method of procedure and the construction of parts without departing from the spirit of the invention. In the following description, and in the claims, parts will be identified by specific names, for convenience, but they are intended to be as generic in their application to similar parts as the art will permit.

Referring now more particularly to Figs. 1 and 2 of the drawing, reference character 10 denotes a tubular welding electrode holder having a tapered electrode-receiving socket 11 at its lower end. Welding electrode 12 is provided with a tapered upper circumferential portion 14 forming a tight fit with tapered socket 11 of holder 10 and has an inner recess 15 therein, conforming in shape to tubular recess 16 in holder 10 and forming a continuation thereof. A cooling fluid inlet tube 17 extends throughout the tubular holder 10 into recess 15 of the welding electrode. A conventional hose attachment member (not shown) may be connected to the upper end of the electrode holder and of the inlet tube whereby the cooling fluid may be introduced into the recess of the welding electrode through the inlet tube and may be withdrawn through the annular space between the inlet tube and the holder in a manner well understood.

To increase the cooling efficiency of the system, a helical groove 18 is machined on the outside surface of the electrode. Helical groove 18 is sealed to the outside by means of a ring or sleeve 19 placed around the extremity of the welding electrode or tip. This ring or sleeve may be constituted of an elastic material, such as rubber, or it may be in the form of a metal sleeve shrunk, soft-soldered or otherwise mechanically attached to the outer surface of the welding electrode so as to prevent coolant leakage from the helical groove. It will be noted that helical groove 18 and external sleeve 19 jointly define a structure in the nature of an external cooling jacket. Groove 18 is connected with the inside cooling fluid hole by means of an inlet channel 20 and an outlet channel 21 so that a portion of the cooling fluid, after cooling the inside of the welding tip, will flow into the helical groove through channel 20 and will be returned to the cooling fluid hole in the electrode through channel 21. In this manner, a very intimate heat exchange relation will be realized between the cooling fluid and both the inner and the outer surfaces of the electrode whereby the efficiency of cooling will be increased to a substantial extent. In addition to its great structural simplicity, this cooling system has the added advantage of being readily applied to existing installations at a moment's notice as all that is needed is to exchange the conventional electrode with that of the present invention.

As shown in Fig. 3, the water cooling hole may be provided with longitudinal splines or flutings, having the shape indicated at 22 or 23, in order to increase the cooling area and thereby the efficiency of the coolant. This is particularly important when welding such materials as aluminum where extremely high current densities are required which cause a considerable temperature rise in the walls of the electrode. It has been found that the described structures permit to retain low overall temperatures in the welding electrode and thereby not only increase the efficiency of the welding operations but at the same time also greatly prolong the useful life of the electrodes.

Fig. 4 shows an external cooling system for welding electrodes in the form of a cooling jacket which may be placed around the extremity of a welding electrode or tip 30. This cooling jacket is made in the form of a tire- or doughnut-shaped body 31 constituted of natural or synthetic rubber, or some other suitable material having at least some elasticity, or stretch. Rims or flanges 32 and 33 on the inner edges of the jacket define a pair of circular openings through which the welding electrode may protrude, a fluid-tight seal being formed with the electrode by the conforming pressure of such rims or flanges. Water or some other cooling fluid may be circulated through the inner space 34 of jacket 31 through intake and discharge nipples 35 and 36, respectively, and being in direct and intimate heat exchange relation with the external surface of electrode 30 provides efficient cooling thereof. It is important that the intake and discharge nipples be arranged in such a manner as to cause the flow of cooling fluid to be around the circumference of the electrode. In the structure of Fig. 4 this is accomplished by having inlet nipple 35 on one side of the jacket and outlet nipple 36 diametrically opposite thereto. Of course, this externally applied cooling may be employed in combination with simultaneous internal cooling of the electrode, or without such internal cooling.

The modified embodiment of the invention shown in Figs. 5 and 6 is in many respects similar to that illustrated in Fig. 4 and comprises an external cooling jacket in the form of a tire-shaped body 40 constituted of rubber and having rims or flanges 41 and 42 on the inner edges thereof defining a pair of circular openings through which the welding electrode 43 may protrude. Intake and discharge nipples 44 and 45, respectively, are integrally formed with jacket 40 for the introduction and the discharge of a cooling fluid. An integrally formed baffle 46 is provided between the intake and the discharge nipples, the nipples being as closely spaced to the baffle as possible. The object of the baffle is to force the flow of cooling fluid around the circumference of electrode 43 thereby to obtain the greatest possible cooling efficiency. The inner end of baffle 46 may be provided with a flange 47 which is pressed against the welding electrode in order to prevent direct leakage of the fluid from the intake to the outlet nipple and to positively assure the circulatory flow around the electrode as indicated by arrows 48. This type of construction is desirable because the inlet and outlet hoses for the cooling fluid may be close together so as not to obstruct the parts being welded, or the welding fixtures.

The principal advantage of the external cooling systems shown in Figs. 4, 5 and 6 resides in the extreme simplicity of their structure. They may be readily applied to a great variety of electrode shapes and as a result of their integrally elastic structure, their dimensions do not have to be closely adjusted to the electrode dimensions. Moreover, the elastic structure permits the sealing surfaces of the rims to accurately conform to the surface of the electrode thereby eliminating leakage of the cooling fluid. The external cooling jacket embodying the invention may be placed on the electrode or may be removed therefrom at a moment's notice. Of course, these advantages could not be obtained by means of rigid-walled cooling jackets which had to be specially fitted for electrodes of even slightly different dimensions so that a large number of different shapes and sizes had to be kept on hand at all times. Rigid-walled cooling jackets also have the disadvantage of frequent fluid leakage and that their installation and removal is a troublesome and time-consuming operation.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A pressure exerting welding electrode system comprising in combination an electrode holder, an electrode fixed in said holder and having depressed portions on the outer surface thereof, means including a sleeve for covering and sealing said depressions from the exterior thereby to define a cooling space without substantially increasing the external diameter of the electrode, and means for passing a flow of cooling fluid through said space.

2. A pressure exerting welding electrode system comprising in combination an electrode holder, an electrode secured to said holder and having a continuous groove provided on the outer surface thereof, a sleeve covering the grooved portion of said electrode and defining therewith a confined cooling channel without substantially increasing the external diameter of the electrode, and means for passing a flow of cooling fluid through said channel in intimate heat exchange relation with the electrode.

3. A pressure exerting welding electrode system comprising in combination a tubular electrode holder, an electrode having an inner recess therein secured to said holder, an inlet tube for cooling fluid extending through said holder into the recess of said electrode, means for maintaining a flow of cooling fluid in said recess through said tube and said holder, means for defining a cooling space around the outer surface of said electrode, and means for diverting at least a portion of said flow of cooling fluid through said cooling space.

4. A pressure exerting welding electrode system comprising in combination a tubular electrode holder, an electrode secured in one end of said holder having an inner recess therein in communication with the space within said holder and having recessed portions in the outer circumferential surface thereof, a sleeve covering the outer recessed portions of said electrode and defining therewith an external cooling channel, means for passing a flow of cooling fluid through the inner recess of said electrode to internally cool the same, and connections between said inner recess and the external cooling channel of said electrode to pass at least a portion of said flow through said channel to externally cool said electrode.

5. A pressure exerting welding electrode system comprising in combination a tubular electrode holder, an electrode secured in one end of said holder having an inner recess therein in communication with the space within said holder and having at least one continuous groove in the outer circumferential surface thereof, a sleeve covering the grooved portions of said electrode and defining therewith an external cooling channel, means including an inlet tube extending within said holder into said recess for passing a flow of cooling fluid therethrough and to internally cool said electrode, and passages connecting said inner recess with the ends of said groove to pass a portion of said flow therethrough and to externally cool said electrode.

6. A pressure exerting welding electrode system comprising in combination a tubular electrode holder, an electrode secured in one end of said holder having an inner recess therein in communication with the space within said holder and having a helical groove in the outer circumferential surface thereof, a sleeve covering the grooved portions of said electrode, an inlet tube extending through the holder into said recess of the electrode, conduit means for introducing cooling fluid into said recess through said inlet tube and for discharging such fluid therefrom through said tubular holder, and passages connecting said recess with the ends of said helical groove to pass a portion of said fluid therethrough in external heat exchange relation with said electrode.

7. In a pressure exerting welding electrode system having a welding electrode with an internal recess therein and means for passing a flow of cooling fluid through said recess, the improvement which comprises a helical groove in the outer circumferential surface of said electrode, a sleeve fluid-tightly covering the grooved portions of said electrode, and passages connecting upper and lower portions of said recess with the ends of said helical groove to pass a portion of said flow of cooling fluid in external heat exchange relation with said electrode.

FRANZ R. HENSEL.
EARL I. LARSEN.